E. ENGBLOM.
CEMENT WATERING TROUGH.
APPLICATION FILED FEB. 10, 1913.
1,092,250.
Patented Apr. 7, 1914.
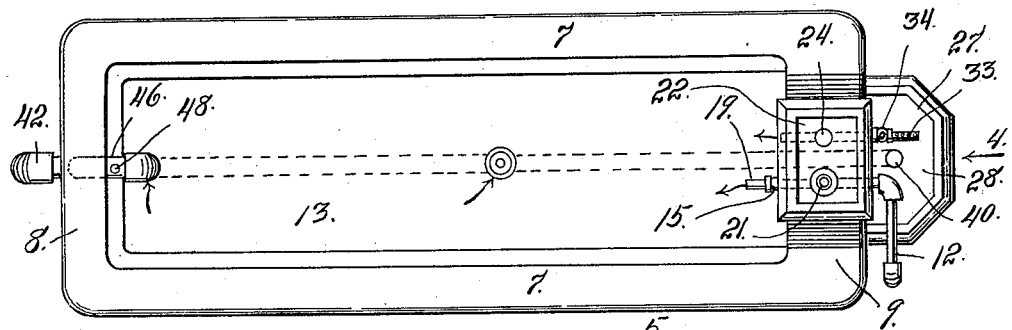
Fig. 1.
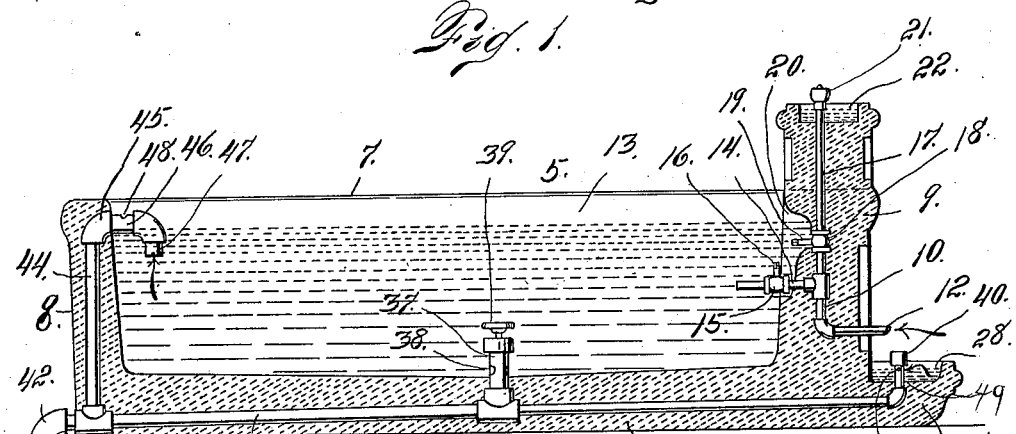
Fig. 2.
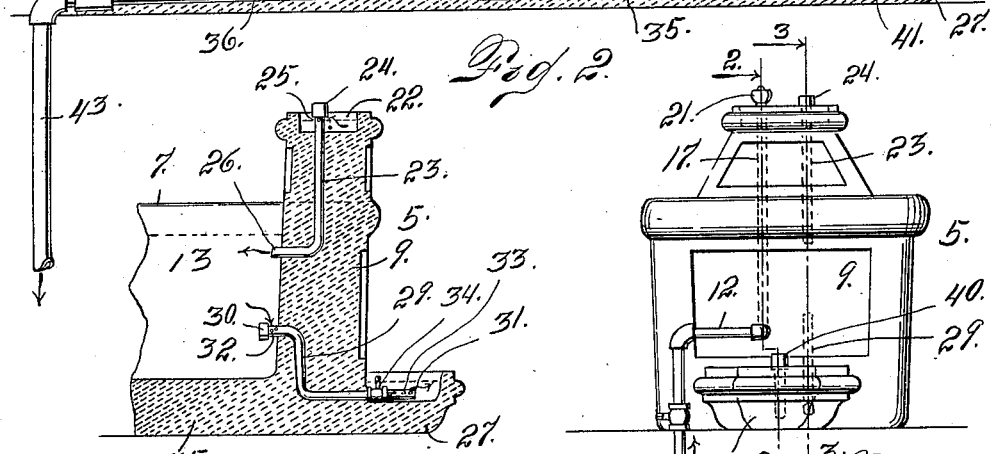
Fig. 3.
Fig. 4.
Witnesses
Otto E. Hoddick.
Lawrence E. Petersen.
Inventor
Eric Engblom.
By
Attorney

UNITED STATES PATENT OFFICE.

ERIC ENGBLOM, OF DENVER, COLORADO, ASSIGNOR OF ONE-HALF TO FRANK GYLLENSTEN.

CEMENT WATERING-TROUGH.

1,092,250. Specification of Letters Patent. Patented Apr. 7, 1914.

Application filed February 10, 1913. Serial No. 747,254.

*To all whom it may concern:*

Be it known that I, ERIC ENGBLOM, a citizen of the United States, residing in the city and county of Denver and State of Colorado, have invented certain new and useful Improvements in Cement Watering-Troughs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in watering troughs composed of cement or other similar material, which when in a plastic state may be poured or placed within a suitable mold and when allowed to stand a suitable length of time becomes hard forming a structure of the shape of the interior of the mold.

The object more particularly sought in this invention is to provide a device of the character stated which shall be well adapted for general use for watering purposes, it being so constructed that it is adapted to supply horses, and small animals as dogs, being also equipped with a so-called bubble discharge, or upwardly projecting nozzle which may be utilized by persons for drinking purposes.

My improved construction is of simple and economical form and will now be described in detail, reference being made to the accompanying drawing, in which is illustrated an embodiment thereof.

In this drawing: Figure 1, is a top plan view of my improved watering trough. Fig. 2 is a vertical longitudinal section, taken approximately upon the line 2—2, Fig. 4. Fig. 3 is a fragmentary section taken through one end of the trough on the line 3—3, Fig. 4. Fig. 4 is an end elevation of the structure or a view looking in the direction of arrow 4, Fig. 1.

The same reference characters indicate the same parts in all the views.

Let the numeral 5 designate the body or cement structure of my improved watering trough, which may have any suitable general design. As illustrated in the drawing, the body of the structure is approximately rectangular in shape, but this, of course, may be of any other suitable or general design, according as circumstances may dictate or as convenience or capacity may require. The body of the structure consists of parallel side walls 7, a rear end wall 8, and a front end wall 9. Embedded within the front end member 9 is a pipe 10 which receives its supply of water from a pipe 12 which extends beyond the trough and is connected with any suitable source of supply (not shown). Communicating with the chamber 13 of the trough is an inlet pipe 14 which is connected at one extremity with the supply pipe 10. Within the chamber of the trough the pipe 14 is provided with a cut off valve 15 which has a stem 16, whose upper extremity is polygonal in cross section whereby it is adapted to receive a socket wrench for manipulating purposes.

Extending upwardly from the pipe 10 is a pipe 17 which virtually forms a continuation of the pipe 10, but is provided with a valve 18, having a stem 19 extending into a recess 20 formed in the inner surface of the end wall 9 of the trough. This stem 19 has its outer extremity fashioned to receive a socket wrench in the same manner as the stem of the valve 15. The recess 20 is formed to permit access to the stem of the valve 18, without requiring that the said stem shall extend into the chamber 13 beyond the inner surface of the wall of the end member 9.

The pipe 17 extends upwardly slightly above the top of the end wall 9 where it terminates in a discharge nozzle 21 which is upwardly directed and adapted to discharge water upwardly for drinking purposes, thus making the structure sanitary for persons.

Formed in the top of the end member 9 is a receptacle 22, which fills with water as the latter bubbles from the nozzle 21. The water is supposed to be continuously discharged from the nozzle 21 and the receptacle 22 is provided with a drain pipe 23 whose upper extremity is closed, as shown at 24, the pipe immediately below the closed extremity 24, being provided with small perforations 25 through which the water may flow for drainage purposes, when it is at the desired level within the receptacle 22. This drainage pipe 23 discharges into the chamber 13 of the trough, as shown at 26.

From the lower extremity of the front wall 9, of the trough, a member 27 extends, the same being provided with a shallow recess or receptacle 28 which receives a supply of water from the main chamber 13 of the trough by way of a pipe 29 whose body portion is embedded within the end wall 9, one extremity 30 extending into the chamber 13 of the trough, while the other extremity 31 enters the shallow receptacle 28, the receptacle 30 being provided with inlet perforations 32 and the extremity 31 with outlet perforations 33. Hence, when the main chamber 13 of the trough is supplied with water to a suitable depth, the shallow receptacle will also be supplied. The outer extremity 31 of the pipe 29, is provided with a cut off valve 34 which is accessible for manipulating purposes whereby the water may be turned on or off at pleasure.

Embedded within the bottom 35 of the trough is a main drainage pipe 36 which has an outlet branch 37 extending upwardly into the main chamber 13 of the trough, being provided with outlet perforations 38 and a valve 39. This pipe 37 is only utilized when it is desired to drain or clean out the trough and normally is not open for discharge. The forward extremity of the pipe 36 is provided with an upwardly directed branch 49 which is closed at the top as shown at 40, the pipe being provided just below its closed extremity with perforations 41, to permit water to enter for drainage purposes. The rear extremity of the pipe 36 connects by means of an elbow 42 with a down pipe 43 which is adapted to be connected with the sewer (not shown) for general drainage purposes.

Connected with the rear extremity of the pipe 36, within the wall of the trough is a vertically disposed pipe 34 whose upper extremity is connected by means of an elbow 45 with a horizontally disposed branch pipe 46 terminating in a short downwardly extending open ended inlet pipe 47, which is so arranged as to allow the water to flow continuously from the chamber 13 of the trough after the water has reached the desired depth therein, assuming that the valve 15 is open, whereby the water is allowed to flow continuously into the chamber 13 of the trough.

From the foregoing description the construction and operation of my improved watering trough will be readily understood. Of course, the various pipes which are engaged within the walls of the trough must be placed in position within the mold before the plastic material is introduced thereto. When the trough is in use, assuming that it is desired that the water shall flow continuously from the three inlet pipes 14, 17 and 29, the valves 15, 17 and 34, are left open. In this event as soon as the water reaches the desired level within the chamber 13, the water will flow continuously through the branch pipe 44 to the drain pipe 36 and thence into the sewer. There will also be a continuous discharge to the drain pipe 36 from the branch pipe 49. The drain pipe 23 will also constantly discharge into the chamber 13 of the trough.

The branch pipe 46 through which the over flow from the body of the trough passes, is provided with a vent port 48 in its upper side to prevent siphoning of water from the trough through the down pipe 43.

Having thus described my invention what I claim is:

1. A watering trough composed of a cement body member having a relatively large water receiving chamber, the upper portion of one end wall of the trough having a cavity therein, a supply pipe leading up through said end wall to said cavity, a branch from said supply pipe leading to the large chamber, a valve in said pipe controlling the flow of water to said cavity, the stem of said valve being located in a recess in the inner side of said end wall and below the ordinary level of water in the large chamber.

2. A watering trough composed of a cement body member having a relatively large water receiving chamber, the upper portion of one end wall of the trough having a cavity therein, a supply pipe leading up through said end wall to said cavity, a branch from said supply pipe leading to the large chamber, a valve in said pipe controlling the flow of water to said cavity and a second valve controlling the flow to the chamber both of said valves being arranged below the normal water level in the chamber.

In testimony whereof I affix my signature in presence of two witnesses.

ERIC ENGBLOM.

Witnesses:
A. J. O'BRIEN,
OTTO E. HODDICK.